US010569668B2

(12) United States Patent
Migneco et al.

(10) Patent No.: US 10,569,668 B2
(45) Date of Patent: Feb. 25, 2020

(54) OCCUPANT AND FIDGET DETECTION OF A SEAT ASSEMBLY

(71) Applicant: Lear Corporation, Southfield, MI (US)

(72) Inventors: Francesco Migneco, Saline, MI (US); David Gallagher, Sterling Heights, MI (US); Samuel Hanlon, Livonia, MI (US); Karl Henn, New Hudson, MI (US); Michelle A. Pereny, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 130 days.

(21) Appl. No.: 15/851,003

(22) Filed: Dec. 21, 2017

(65) Prior Publication Data

US 2019/0193591 A1 Jun. 27, 2019

(51) Int. Cl.
*B60N 2/02* (2006.01)
*G06K 9/00* (2006.01)
*B60N 2/66* (2006.01)
*B60N 2/90* (2018.01)
*B60N 2/00* (2006.01)
*B60N 2/04* (2006.01)

(52) U.S. Cl.
CPC ........... *B60N 2/0244* (2013.01); *B60N 2/002* (2013.01); *B60N 2/665* (2015.04); *B60N 2/914* (2018.02); *G06K 9/00335* (2013.01); *G06K 9/00536* (2013.01); *B60N 2/04* (2013.01); *B60N 2002/0268* (2013.01)

(58) Field of Classification Search
CPC ...... B60N 2/0244; B60N 2/914; B60N 2/665; B60N 2/002; B60N 2002/0268; B60N 2/04; G06K 9/00335
See application file for complete search history.

(56) References Cited

U.S. PATENT DOCUMENTS

| 6,345,839 | B1 * | 2/2002 | Kuboki | B60N 2/002 280/735 |
| 8,616,654 | B2 * | 12/2013 | Zenk | B60N 2/914 297/452.41 |
| 9,815,385 | B2 * | 11/2017 | Lippman | B60N 2/002 |
| 2008/0255731 | A1 | 10/2008 | Mita et al. | |
| 2008/0267460 | A1 * | 10/2008 | Aoki | B60R 21/017 382/118 |
| 2009/0030578 | A1 | 1/2009 | Periot et al. | |
| 2012/0086249 | A1 * | 4/2012 | Hotary | B60N 2/809 297/284.3 |

(Continued)

FOREIGN PATENT DOCUMENTS

CN 104252615 A 12/2014
DE 102010049152 A1 11/2011

(Continued)

*Primary Examiner* — Thomas Ingram
(74) *Attorney, Agent, or Firm* — Brooks Kushman P.C.

(57) ABSTRACT

A seat assembly is provided with sensors. A controller measures pressure in a plurality of regions with a seated occupant over a period of time. A change in pressure is determined from an initial seating position to a second seating position and evaluated to determine a vector of pressure change. A fidget is identified if the vector exceeds a predetermined value. A camera is directed at the seat bottom and the seat back. The controller evaluates a camera input to determine anatomical dimensions of the seated occupant.

18 Claims, 4 Drawing Sheets

(56) References Cited

U.S. PATENT DOCUMENTS

| | | |
|---|---|---|
| 2013/0090816 A1 | 4/2013 | Huber |
| 2013/0251216 A1 | 9/2013 | Smowton et al. |
| 2014/0319895 A1 | 10/2014 | Lange-Mao et al. |
| 2015/0351692 A1 | 12/2015 | Pereny et al. |
| 2015/0352979 A1 | 12/2015 | O'Bannon et al. |
| 2015/0352990 A1 | 12/2015 | Zouzal et al. |
| 2017/0043681 A1* | 2/2017 | Seiller ................ B60N 2/0248 |
| 2017/0086588 A1* | 3/2017 | Patrick ............... B64D 11/0647 |

FOREIGN PATENT DOCUMENTS

| | | |
|---|---|---|
| DE | 102012216869 A1 | 3/2014 |
| FR | 2988654 A1 | 10/2013 |
| JP | 2001269380 A | 10/2001 |
| JP | 2009172145 A | 8/2009 |
| WO | 2011144280 A1 | 11/2011 |
| WO | 2013144498 A1 | 10/2013 |

\* cited by examiner

FIG. 11

OCCUPANT AND FIDGET DETECTION OF A SEAT ASSEMBLY

TECHNICAL FIELD

Various embodiments relate to fidget detection and occupant detection of a seat assembly.

BACKGROUND

U.S. Patent application publication No. US 2015/0352979 A1, which published on Dec. 10, 2015 to O'Bannon et al. discloses an Adjustable Seat Assembly.

SUMMARY

According to at least one embodiment a method for detecting a fidget from a seated occupant measures pressure in a plurality of regions of a seat assembly with a seated occupant over a period of time. A change in pressure is determined from an initial seating position to a second seating position in the plurality of regions of the seat assembly with the seated occupant over the period of time. The change in pressure in the plurality of regions is evaluated to determine at least one vector of pressure change. A fidget is identified if the at least one vector exceeds a predetermined value.

According to at least another embodiment, a seat assembly is provided with a seat bottom and a seat back adapted to extend upright and adjacent to the seat bottom. A plurality of sensors is provided in at least one of a frame, foam, and trim of at least one of the seat bottom and the seat back. A controller is in communication with the plurality of sensors and is programmed to detect a fidget from a seated occupant by measuring pressure in a plurality of regions of a seat assembly with a seated occupant over a period of time. A change in pressure is determined from an initial seating position to a second seating position in the plurality of regions of the seat assembly with the seated occupant over the period of time. The change in pressure in the plurality of regions is evaluated to determine at least one vector of pressure change. A fidget is identified if the at least one vector exceeds a predetermined value.

According to at least another embodiment, a seat assembly is provided with a seat bottom and a seat back adapted to extend upright and adjacent to the seat bottom. A plurality of sensors is provided in the seat bottom and the seat back. A controller is in communication with the plurality of sensors and is programmed to receive input from the sensors indicate of a seating position of a seated occupant, and detect a fidget from the seated occupant.

According to at least another embodiment, a seat assembly is provided with a seat bottom and a seat back adapted to extend upright and adjacent to the seat bottom. A camera is directed at the seat bottom and the seat back. A controller is in communication with the camera and is programmed to receive input indicative of a visual representation of a seated occupant from the camera. The controller evaluates the camera input to determine anatomical dimensions of the seated occupant.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A comfort, posture and wellness seating system for vehicle seat assemblies provides a visual interface with adjustment hardware organically or inorganically. The system may be employed to properly configure any new or existing seating system. The system can also address specific comfort, posture and wellness needs or preferences. The seating system objectifies comfort data and biomechanical knowledge to make the data transferable.

The comfort, posture and wellness seating system integrates anthropometry, biomechanics, and historical seating comfort data. The seating system can be employed in original equipment for vehicles or in aftermarket products. Applicable markets include automotive, mass transit, airlines, etc., as well as non-vehicular seating such as office, home, commercial, and public venue seating.

Data collection may be conducted that includes expert positioning of a suitable sample of occupants for optimal comfort or preferred posture by a medical professional. The data collection can be used at specific sites on an ongoing basis if required. The expert input provides an elevated level of expert comfort, posture and personalized fitting. The data may be based on anthropometry, body pressure distribution (BPD), status of actuators (such as pressure of inflatable air bladders, status of valves or the like), or other data that provides a comfort, posture and biomechanically optimized position of an adjustable vehicle seat assembly. The data is collected in a knowledge base or table for setting adjustments based on categories of data. The knowledge base may be compiled from the expert positioned data and the occupant specific data. The setting adjustments from the knowledge base are utilized for pre-set options in a vehicle seat assembly 20. The setting adjustments can be customized by a user at a controller or display.

Input data can be plotted versus adjustment settings for high level categorization. The settings can be categorized by topology clustering for setting the pre-set options. Various setting options may be provided for various types of driving. For example, a touring setting may provide per package settings and basic comfort, posture and wellness recommendations. The touring setting may also provide optimal visibility, use of features and controls, and the like. A performance setting may be provided for active drivers to provide a more erect position with firmer seating. Additionally, a luxury setting may be more reclined with softer seating.

Figure 1:
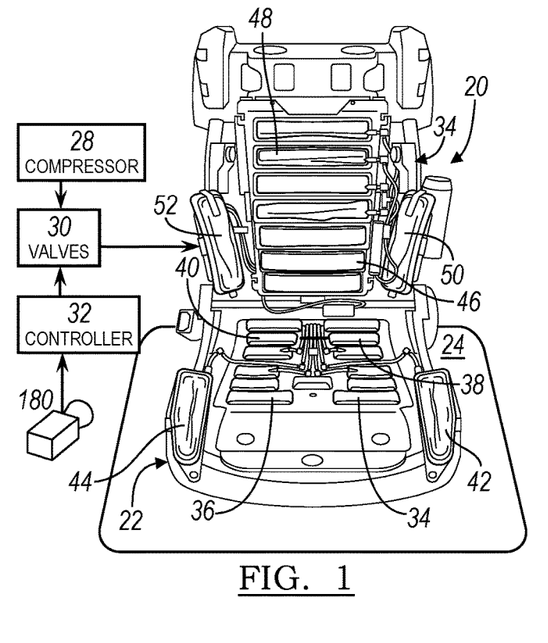
FIG. 1 is a front perspective view of a seat assembly, illustrated partially disassembled, of a vehicle seating system according to an embodiment.

FIG. 1 illustrates a vehicle seat assembly 20 with a cover removed. The seat assembly 20 includes a seat cushion 22 adapted to be mounted for motor-driven adjustable translation in a fore and aft direction and in an up and down direction of a vehicle 24. The seat assembly 20 includes a seat back 26 pivotally connected to the seat cushion 22 to extend generally upright relative to the seat cushion 22 for motor-driven pivotal adjustment relative to the seat cushion 22. A head restraint (not shown) is mounted for motor-driven adjustable translation to the seat back 26.

At least one compressor 28 provides a source of air to the seat assembly 20. A plurality of valves 30 receive the compressed air and are controlled by a controller 32 for regulating compressed air into and out of the seat assembly 20. The seat cushion 22 includes a plurality of pneumatic elements or pneumatic actuators, such as air bladder assemblies. The seat cushion 22 includes a forward left air bladder assembly 34, a forward right air bladder assembly 36, a rear left air bladder assembly 38, a rear right air bladder assembly 40, a left side bolster air bladder assembly 42, and a right-side bolster air bladder assembly 44. The seat back 26 includes a plurality of lumbar air bladder assemblies 46, a plurality of thoracic air bladder assemblies 48, a left side bolster air bladder assembly 50, and a right-side bolster air bladder assembly 52. Although one arrangement of air bladder assemblies 34, 36, 38, 40, 42, 44, 46, 48, 50, 52, is illustrated, any quantity and arrangement of air bladder assemblies may be employed.

The valves 30 may be provided as a common valve bank that is housed in the seat back 26 or under the seat cushion 22. Alternatively, the valves 30 may each be provided on each of the air bladder assemblies 34, 36, 38, 40, 42, 44, 46, 48, 50, 52. The compressor 28 may be provided in the seat back 26, the seat cushion 22 or concealed within the vehicle body 24. The controller 32 may be provided in a module under the seat cushion 22, and may be a multifunction controller that also controls other functions in the vehicle.

The controller 32 may receive adjustment settings from pre-set data or from customized data. The data may be input from an interface that is provided in the vehicle. The interface may be integrated into the vehicle, such as an instrument panel display that is in suitable wired or wireless communication with the controller 32. The interface may be remote, such as a personal digital assistant (PDA) including phones, tablets and the like. The interface may be provided as a smart phone application, wherein users enter relevant information about themselves. The smart phone interface may not require on-site expertise or seat properties. The remote interface permits a user to transport settings to each vehicle, such as personal passenger vehicles, airline seating, rental cars, and the like.

Figure 2:
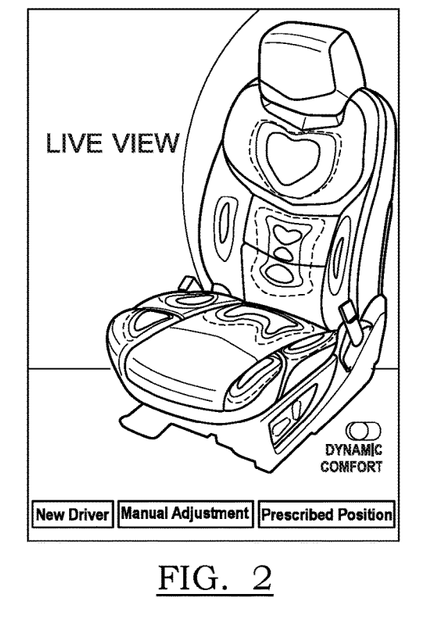
FIG. 2 is a display image for the vehicle seating system of FIG. 1, according to an embodiment.

FIG. 2 illustrate a display image from an interface, such as a tablet. The display may collect data from the occupant as described in Pereny et al. U.S. Patent Application Publication No. US 2015/0351692 A1, which is incorporated in its entirety by reference herein. Each of the air bladder assemblies 34, 36, 38, 40, 42, 44, 46, 48, 50, 52 may include a pressure sensor to detect air pressure in the respective air bladder assemblies 34, 36, 38, 40, 42, 44, 46, 48, 50, 52. Any pressure sensor is contemplated, such as a pneumatic pressure sensor at the outlet valve of each air bladder assemblies 34, 36, 38, 40, 42, 44, 46, 48, 50, 52. Pressure can also be sensed by contact pressure sensors disposed in front of or behind some or all of the air bladder assemblies 34, 36, 38, 40, 42, 44, 46, 48, 50, 52, including on a front or rear surface thereof. The contact pressure sensors may include force transducers, piezoelectric sensors, doppler sensors, thermal sensors (infrared or thermocouples), capacitive sensors, or pressure-sensing mats, such as those available by Tekscan®, Inc. of 307 West First Street. South Boston, Mass. 02127-1309, USA, or any sensor with capability of detecting relative movement of the occupant.

FIG. 2 illustrates a depiction of the vehicle seat assembly 20 with zones ranging in color to depict a distribution of pressure upon the seat. This visualization may assist an occupant in positioning upon the seat assembly 20 with live visual feedback. A dynamic comfort, posture and wellness option is offered. Selection of the dynamic comfort option measures the pressure in the sensors at FIG. 1, and displays a live view as in FIG. 2. The controller 32 compares the sensor values, and if the controller 32 determines that the occupant is not seated evenly, the controller 32 balances the air pressure in opposing air bladders to balance the occupant seating position. The adjustment of the seat assembly 20 may be performed as described in O'Bannon et al. U.S. Patent Application Publication No. US 2015/0352979 A1, which is incorporated in its entirety by reference herein. The adjustment of the seat assembly 20 may also be performed as described in Zouzal et al. U.S. Patent Application Publication No. US 2015/0352990 A1, which is also incorporated in its entirety by reference herein.

Figure 3:
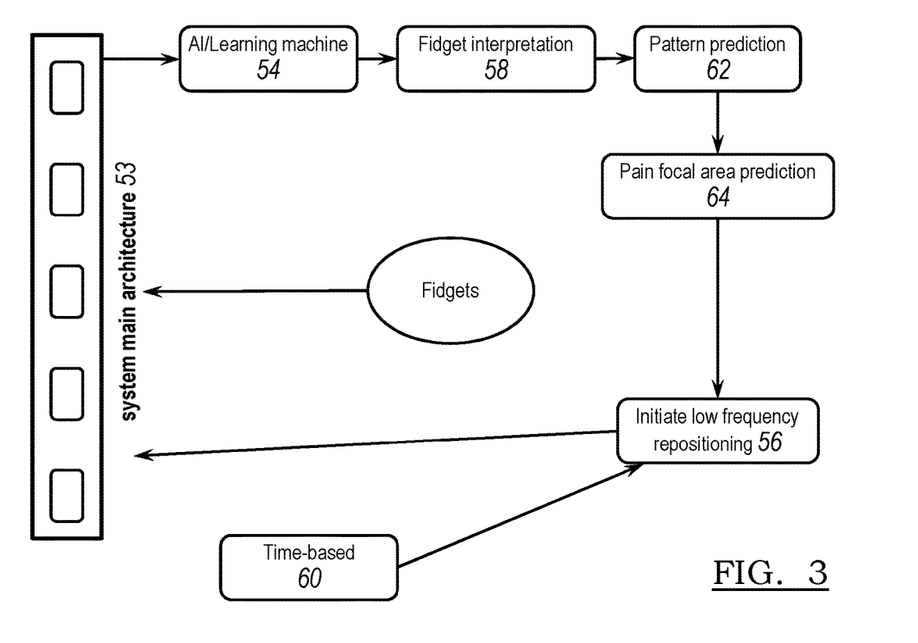
FIG. 3 is a schematic diagram of the vehicle seating system of FIG. 1, according to another embodiment.

Referring now the FIG. 3, the seating system employs the pressure-based system as a biometric detecting device. FIG. 3 illustrates a system main architecture 53 for the seat assembly 20. The system main architecture 53 may be provided in the controller 32. The system main architecture 53 detects repetitive-pattern motions known as "fidgets" that are characteristic of an occupant that is in pain, distress or otherwise in physical discomfort. When a seated occupant is experiencing pain or discomfort, an instinctive reaction is to fidget or move away from the discomfort. The discomfort may also be cause from fatigue, such as when the occupant sits for too long, and blood is not sufficiently circulated. The fidget is an instinctive attempt by the occupant to remove pressure from the area of pain or discomfort. However, oftentimes, a fidget may be an overreaction. By deconstructing specific movement patterns, the system quantifies the level of discomfort and predicts the focal point causing pain and discomfort.

A software-driven algorithm, coupled with an artificial intelligence (AI) or learning machine 54, senses the repetitive pattern and offers countermeasures to eliminate the source of pain or discomfort, such as active repositioning, rhythmic inflation-deflation of the bladders to mimic massage, low frequency repositioning 56 or the like. The display may permit input form the occupant for selection or modification of the fidget countermeasures.

Countermeasures for a detected fidget include a control of the inflation and/or deflation of the air bladder assemblies 34, 36, 38, 40, 42, 44, 46, 48, 50, 52 situated in the cushion 22 to generate massage, repositioning and a side to side and fore-aft shifting of the body weight to reduce pressure, pain and discomfort generated by a stationary position. According to one example, the air bladder assemblies 34, 36, 38, 40, 42, 44, 46, 48, 50, 52 inflate and deflate for each direction of shifting within a period of thirty seconds or more, to reduce occupant perception and to maintain a constant movement, such as a counterfidget. The period may be occupant specific, and may be up to ten minutes.

The activation of the counterfidgets may be determined after detecting a fidget with sensors and a software-driven algorithm such as fidget interpretation 58, coupled with the AI machine 54. Once the threshold for fidgeting is detected by the fidgeting sensing system, a rhythmic, low frequency inflation/deflation is initiated. The counterfidgets may be time-based 60, such as initiation within thirty minutes of sitting, and paused every two hours to reassess the fidgeting situation. After fidget interpretation 58, a pattern prediction 62 may be developed and a pain focal area of the occupant 64 can be predicted to apply the low frequency repositioning.

The sensors placed in the seat cushion 22 may also be employed to measure a weight of the occupant by recording the change in pressure, as detected by the on-board pressure sensor. Weight and a calculated body mass index (BMI) may added general wellness bundle along with oxygen sensing, blood pressure and stress monitoring, which may be calculated by parallel biometric systems.

Figure 4:
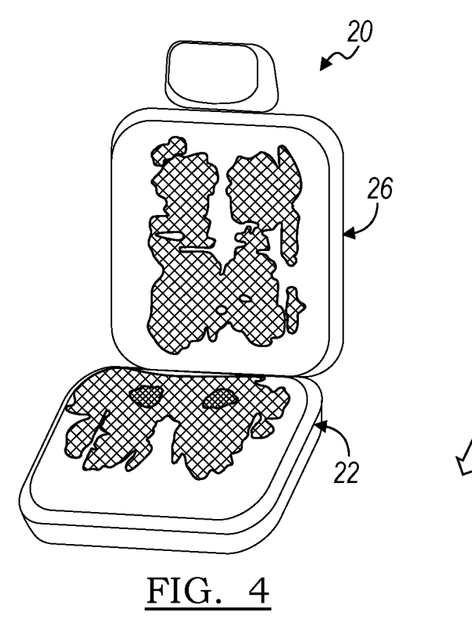
FIG. 4 is another display image for the vehicle seating system of FIG. 1, illustrating a position of a seated occupant.
Figure 5:
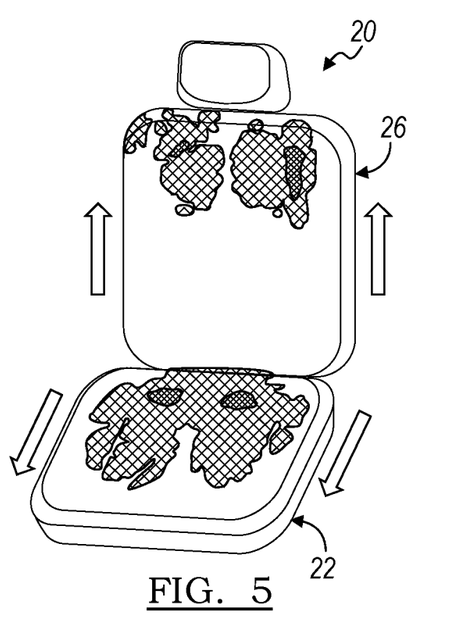
FIG. 5 is another display image for the vehicle seating system of FIG. 1, illustrating another position of the seated occupant.
Figure 6:
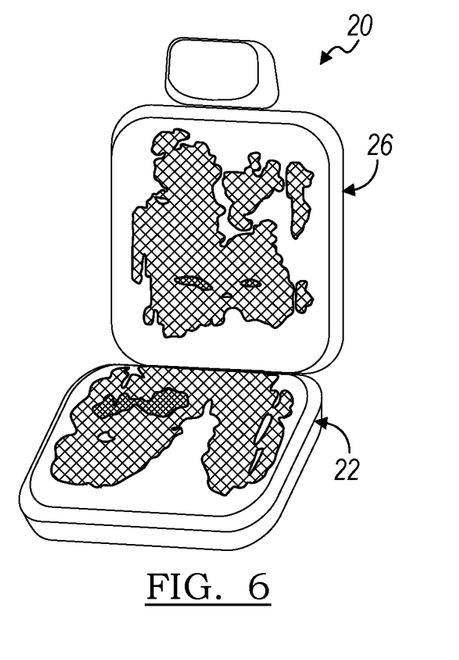
FIG. 6 is another display image for the vehicle seating system of FIG. 1, illustrating another position of the seated occupant.
Figure 7:
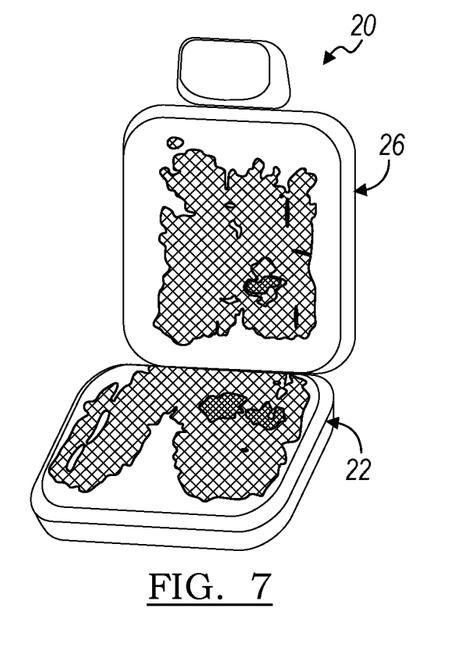
FIG. 7 is another display image for the vehicle seating system of FIG. 1, illustrating another position of the seated occupant.

FIG. 4 illustrates a display of a static seating condition of an occupant by an example, which illustrates a pressure distribution of the occupant. FIGS. 5-7 illustrate example displays that representative of fidgets that are derived from specific types of pain. For example, FIG. 5 illustrates a pressure distribution of a fidget associated with lumbar pain, wherein the pressure against the lumbar zone of the seat back 26 of the seat assembly 20 is redistributed to an upper region of the seat back 26 and the seat cushion 22. FIG. 6 illustrates another pressure distribution of the seated occupant associated with left seat pain, whereby the occupant shifts his or her weight to the right. Likewise, FIG. 7 illustrates pressure distribution of the seated occupant in response to a fidget associated with right seat pain, with the weight redistributed to the left side. Specific distributions have been studied with weight distribution vector redundancy to measure and detect fidgets. Although specific pain or discomforts are described in the context of specifically measured fidgets, any discomfort may be addressed if measurable by occupant movement.

Figure 8:
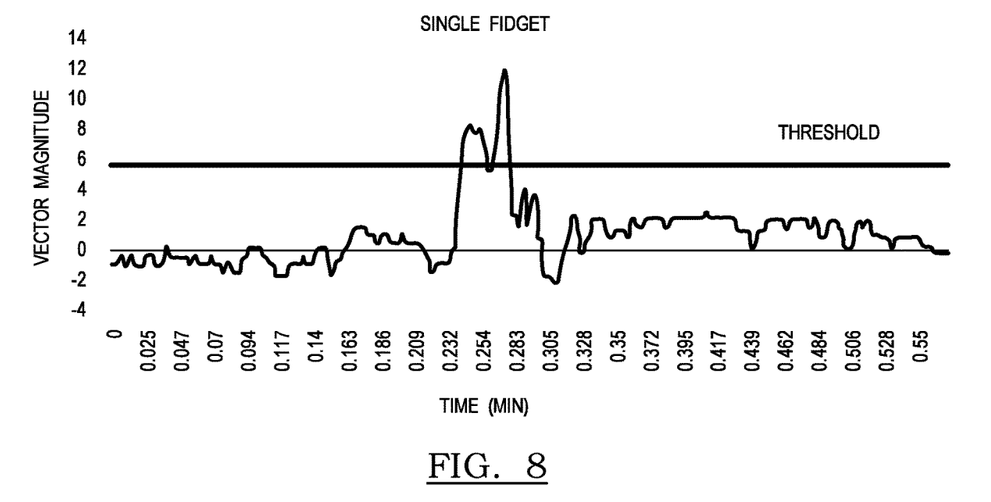
FIG. 8 is a graph of a fidget magnitude measured over time by the seating system of FIG. 1.

FIG. 8 is a graph of an example of a detected fidget with time in minutes on the abscissa, and with a vector magnitude at the ordinate. FIG. 8 is a graph of one identified fidget; and fidgets may vary in magnitude, pattern, period and frequency depending upon the seating application, the sensors employed, the air bladder assemblies and the arrangement thereof, the occupant, and the like. Fidgets take on specific behavior in many cases. A fidget may include an initial spike, initiating at approximately 0.232 minutes on the graphed example, or earlier. A vector magnitude of a standard deviation of six has been identified as a representation of a fidget for this example. Of course, the standard deviation magnitude of a detected fidget may vary depending upon the embodiment. Fidgets have been measured at a standard deviation of one and greater, such as 2.5. Occasionally, the fidget may include a mid-fidget rebound illustrated approximately after 0.254 minutes on the graph. The rebound may be below the threshold. The fidget often includes another spike after the rebound, illustrated after the rebound and discontinuing at approximately 0.283 minutes on the graph. The fidget typically occurs within a period of one to thirty seconds. According to another embodiment, a fidget may occur within a period of four to ten seconds. In the graph, the period of the example fidget is approximately six seconds.

A fidget may be followed by an occupant readjustment, such as a slight mean shift for approximately thirty to sixty seconds, such as the readjustment of approximately a standard deviation of two illustrated on the graphed example after 0.305 minutes to approximately 0.55 minutes.

Figure 9:
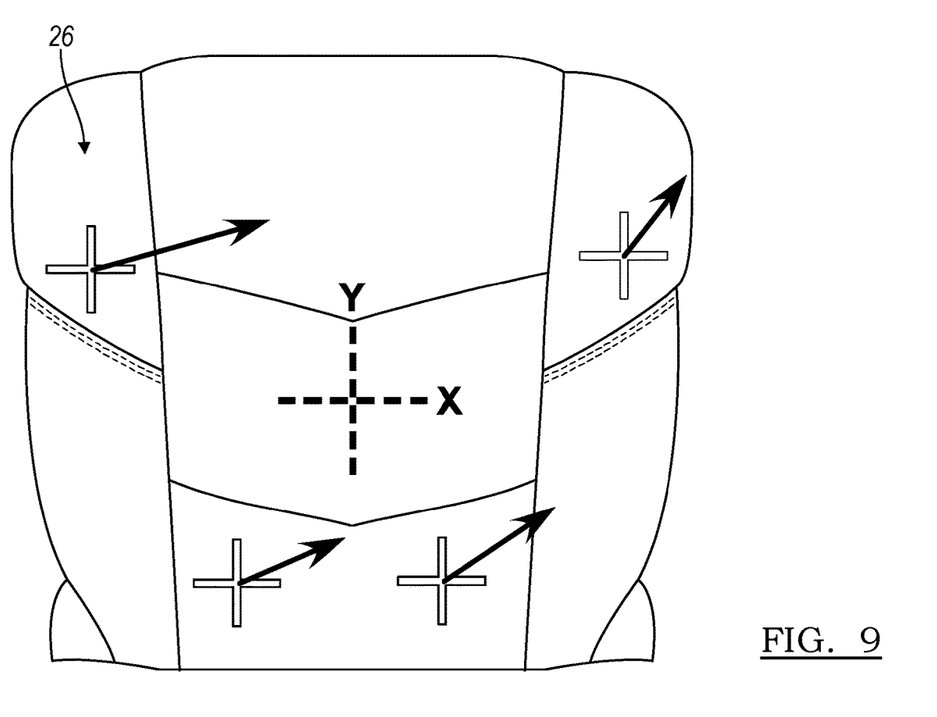
FIG. 9 is a front perspective view of a seat back of the seat assembly of FIG. 1 illustrating a plurality of vectors measured by the vehicle seating system.

FIG. 9 illustrates the seat back 26 with a representative vector system displayed schematically upon the seat back 26. The seat back 26 is illustrated with an x-y coordinate system oriented centrally upon the seat back 26 as a reference origin. Vectors are illustrated on a plurality of air bladder assemblies to demonstrated a relative net pressure change detected at each air bladder assembly. The values are omitted; however, the vectors illustrate representative changes in pressure in the x-y directions of a seated occupant from an initial seating position to a subsequent seating position over a period of time. Vectors that point in the same direction and exceed a predetermined value, such as greater than a standard deviation of 2.5 (also represented as 2.5σ or 2.5 sigma) indicate a distinct motion that is identified as a fidget. The detection of the fidget may be employed to detect a location of potential pain or discomfort experienced by the occupant. Conversely, vectors that point in opposite directions or with low magnitude display random motion are not used as a fidget. The system filters out motions associated with ordinary use, like moving in the seat assembly 20, or acceleration upon the occupant from the vehicle, or the like.

Various testing has been performed over time for a dynamic evaluation of the fidget detection system with much success. The objective or measured data for pain detection was compared to subjective data gathered from the tested occupants to confirm the evaluation results.

Figure 10:
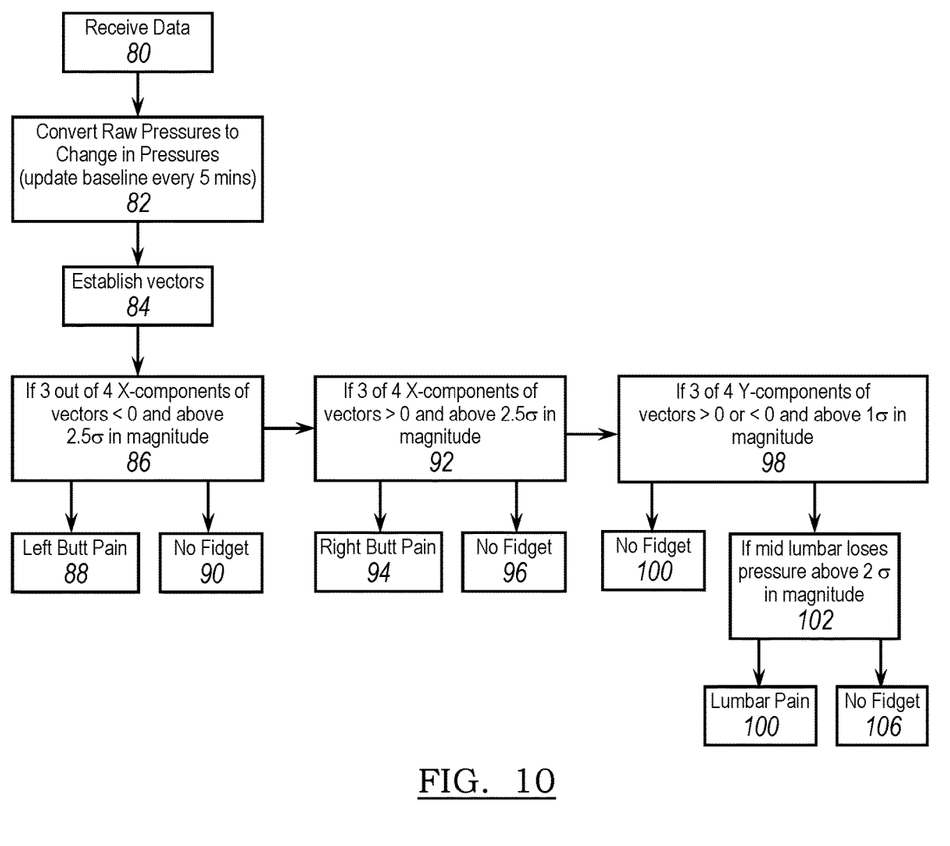
FIG. 10 is a flowchart of a method for detecting a fidget of an occupant in a seat assembly according to an embodiment.

FIG. 10 illustrates a method for detecting a fidget according to an embodiment. At block 80, the controller 32 received pressure data from the sensors. At block 82, the raw pressure data is converted to changes in pressure over a period of time, such as a baseline that is update periodically, such as every five minutes. At block 84, vectors are established for the measured changes in pressure.

At block 86, the controller 32 determines if three out of four x-components of the vectors is less than zero and above a standard deviation of 2.5 in magnitude. If so, it is determined at block 88 that a fidget associated with a left bottom pain has been detected. If not, then it is determined at block 90 that a fidget associated with left bottom pain has not been detected.

At block 92, the controller 32 determines if three out of four x-components of the vectors is greater than zero and above a standard deviation of 2.5 in magnitude. If so, it is determined at block 94 that a fidget associated with a right bottom pain has been detected. If not, then it is determined at block 96 that a fidget associated with right bottom pain has not been detected.

At block 98, the controller 32 determines if three out of four y-components of the vectors is greater than zero or less than zero and above a standard deviation of one in magnitude. If not, then it is determined at block 100 that a fidget associated with lumbar pain has not been detected. If so, it is determined at block 102 if a mid-lumbar region loses pressure over a standard deviation above two in magnitude. If so, then the controller 32 determines at block 104 that a fidget associated with lumbar pain has been detected. If not, then the controller 32 determines at block 106 that a fidget has not been detected.

The fidget detection measures the pressure as the occupant returns to the initial seating position to also determine a period for each fidget, a period between fidgets, and a frequency of fidgets over time to determine a dynamic comfort for the occupant. Fidget patterns can be monitored and stored. For example, fidgets detected in the seat back 26 often include an initial spike with a gradual decrease over time to a low magnitude of oscillation that is associated with ordinary seating conditions. Fidgets detected with the seat cushion 22 also include an initial spike. However, fidgets detected in the seat cushion 22 also gradually decrease to mid-magnitude oscillation. Occupants tend to continue to move and adjust the seating pattern in the seat cushion 22, even when there is not a pain-related fidget in order to get comfortable. Also, pressure changes in the seat cushion 22 are common when there is pain in other locations, such as in the seat back 26.

Fidget frequency has a relationship with comfort. Stated another way, discomfort and fidget frequency have an overall trend correlation. For example, as discomfort increases, fidgeting also increases. In the presence of fidgets, and therefore discomfort, the relative reduction in pressure and pain have a negative local correlation. Local minima of pressure are usually present when there are local maxima of pain, and vice versa. Fidgeting relieves the perceived pain.

Briefly, the seat assembly 20 detects repetitive pattern motions and predicts with a high degree of accuracy if the occupant is in pain or in discomfort and identifies the location of the pain or discomfort. By analyzing the specific pattern, the controller 32 can predict if a repetitive pattern is occurring, and if that pattern can be associated with a specific focal point (affected area) responsible for pain and/or discomfort.

In order to increase the predictivity of the controller 32, a learning machine 54 and/or software with a library of repetitive patterns may be employed. If a pain node is detected based on the fidget, the seat assembly 20 may provide a variety of countermeasures to remove pressure to the affected area, and relieve the discomfort or pain. The countermeasures can also be activated, regardless of the discomfort detected, on a time basis.

For example, one countermeasure may provide a haptic vibration in a region of the predicted pain to provide feedback to the occupant. The haptic vibration may be generated by the controller 32 by inflating and/or deflating one of the bladder assemblies. The seat assembly 10 may also include a heating, ventilation and/or air conditioning, which may be employed upon the target region. Low frequency repositioning of the seat assembly 10 may also be employed to countermeasure fidgets. For example, when fidgets are detected, but the frequency is gradually decreasing below standard levels, this pattern may be associated with fatigue. The countermeasures can be employed to make the occupant more alert, or to promote circulation.

The comfort of a seat assembly is typically a subjective and is a matter of individual preference and opinion. However, seat comfort can be objectively measured by detection of fidget frequency with the seat assembly 10. For a seat assembly without integral pressures sensors, an appropriate pressure mat or any other pressure/force/movement/electrodermal potential (EDP) based sensor may be draped over the seat or integrated with any portion of the frame, foam, trim or the like, to derive the "objective" comfort of each tested seat by analyzing the unique fidgeting patterns.

Figure 11:
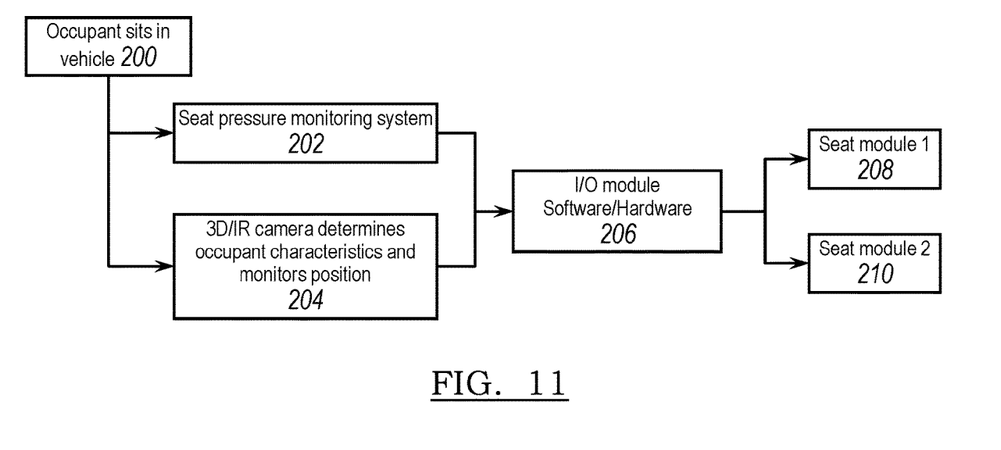
FIG. 11 is a flowchart of a method for determining data of an occupant in a seat assembly according to an embodiment.

Referring again to FIG. 1, a camera 180 may be provided in the vehicle and directed at the seat assembly 20. The camera 120 is in communication with the controller 32 according to an embodiment. The camera may be a two-dimensional camera, a three-dimensional camera, an infrared camera, or the like. Referring now to FIG. 11, the occupant sits in the seat assembly 20 at block 200. In block 202 the seat pressure monitoring system monitors the pressure of the occupant as described in various embodiments above. Concurrently, in block 204, the camera 180 and the controller 32 measure and determine occupant anatomical characteristics and position. Some of the characteristics may include, but are not limited to, height, hip, chest, shoulder width, height of the head in respect to the shoulder and the neck, and the like. The camera may read the occupant anatomical dimensions in order to identify the particular occupant, such as facial recognition, as is known in the art.

At block 206, the input/output module of software/hardware of the controller 32 evaluates the identification of the occupant and the detected seating position of the occupant. At block 208, a seat module adjustment is performed to adjust the seat based on settings saved for the occupant. At block 210 a seat module adjustment is performed to adjust the seat with readjustments based upon the occupant's seated position.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for detecting a fidget from a seated occupant comprising:
measuring pressure in a plurality of regions of a seat assembly with a seated occupant over a period of time;
determining a change in pressure from an initial seating position to a second seating position in the plurality of regions of the seat assembly with the seated occupant over the period of time;
evaluating the change in pressure in the plurality of regions to determine at least one vector of pressure change;
identifying a fidget if the at least one vector of pressure change exceeds a predetermined value;
determining a change in pressure from the second seating position back to the initial seating position; and
identifying the fidget if the seating position returns to the initial seating position.

2. The method of claim 1 further comprising measuring a period of time from the initial seating position to the second seating position and back to the initial seating position; and
identifying the fidget if the period of time is within a predetermined range.

3. The method of claim 2 wherein the predetermined range is one to thirty seconds.

4. The method of claim 1 further comprising:
identifying a plurality of fidgets over a period of time;
determining a period of time between fidgets; and
identifying a fidget pattern if the period of time between fidgets is within a predetermined range.

5. The method of claim 4 wherein the predetermined range for an identified fidget pattern is thirty seconds to ten minutes.

6. The method of claim 1 wherein the predetermined value is a standard deviation of at least one.

7. A seat assembly comprising:
a seat bottom;
a seat back adapted to extend upright and adjacent to the seat bottom;
a plurality of sensors provided in at least one of a frame, foam and trim of at least one of the seat bottom and the seat back; and
a controller in communication with the plurality of sensors and programmed to detect a fidget according to a method comprising:
measuring pressure in a plurality of regions of a seat assembly with a seated occupant over a period of time,
determining a change in pressure from an initial seating position to a second seating position in the plurality of regions of the seat assembly with the seated occupant over the period of time,
evaluating the change in pressure in the plurality of regions to determine at least one vector of pressure change,
identifying a fidget if the at least one vector of pressure change exceeds a predetermined value,
determining a change in pressure from the second seating position back to the initial seating position, and
identifying the fidget if the seating position returns to the initial seating position.

8. The seat assembly of claim 7 further comprising a plurality of adjustable air bladder assemblies in communication with the controller; and
wherein each of the plurality of sensors comprises at least one of a pressure sensor, force sensor, movement sensor and an electro-dermal potential sensor.

9. The seat assembly of claim 8 wherein the controller is further programmed to calculate a weight of the seated occupant.

10. The seat assembly of claim 9 wherein the controller is further programmed to calculate a body mass index of the seated occupant.

11. The seat assembly of claim 7 further comprising at least one actuator in communication with the controller and operably connected to at least one of the seat bottom and the seat back; and
wherein the controller is further programmed to adjust the at least one actuator to reposition the seated occupant in response to detecting the fidget.

12. The seat assembly of claim 7 further comprising at least one pneumatic actuator in communication with the controller and operably connected to at least one of the seat bottom and the seat back; and
wherein the controller is further programmed to adjust the at least one pneumatic actuator to reposition the seated occupant in response to detecting the fidget.

13. The seat assembly of claim 7 further comprising at least one actuator in communication with the controller and operably connected to at least one of the seat bottom and the seat back; and
wherein the controller is further programmed to adjust the at least one actuator to vibrate the seated occupant in response to detecting the fidget.

14. The seat assembly of claim 7 further comprising at least one pneumatic actuator in communication with the controller and operably connected to at least one of the seat bottom and the seat back; and
wherein the controller is further programmed to rhythmically adjust the at least one pneumatic actuator to deliver at least one of a whole seat massage or a localized massage to the seated occupant in response to detecting the fidget.

15. The seat assembly of claim 7 further comprising at least one thermal actuator in communication with the controller and operably connected to at least one of the seat bottom and the seat back; and
wherein the controller is further programmed to adjust a temperature of the at least one thermal actuator in response to detecting the fidget.

16. The seat assembly of claim 7 further comprising:
a camera directed at the seat bottom and the seat back; and
wherein the controller is further programmed to receive input indicative of a visual representation of a seated occupant from the camera, and evaluate the camera input to determine anatomical dimensions of the seated occupant.

17. The seat assembly of claim 16 wherein the controller is further programmed to determine at least one of occupant height, hip width, chest width, shoulder width, and a height of a head relative to a shoulder and a neck.

18. The seat assembly of claim 16 further comprising at least one actuator in communication with the controller and operably connected to at least one of the seat bottom and the seat back for adjustment of at least one of a plurality of seating positions of the seat assembly; and
wherein the controller is further programmed to compare the anatomical dimensions with predetermined ranges and adjust the at least one actuator to one of the plurality of seating positions corresponding to one of the predetermined ranges.

* * * * *